2,807,573
PURIFICATION OF ACRYLONITRILE BY EXTRACTIVE DISTILLATION

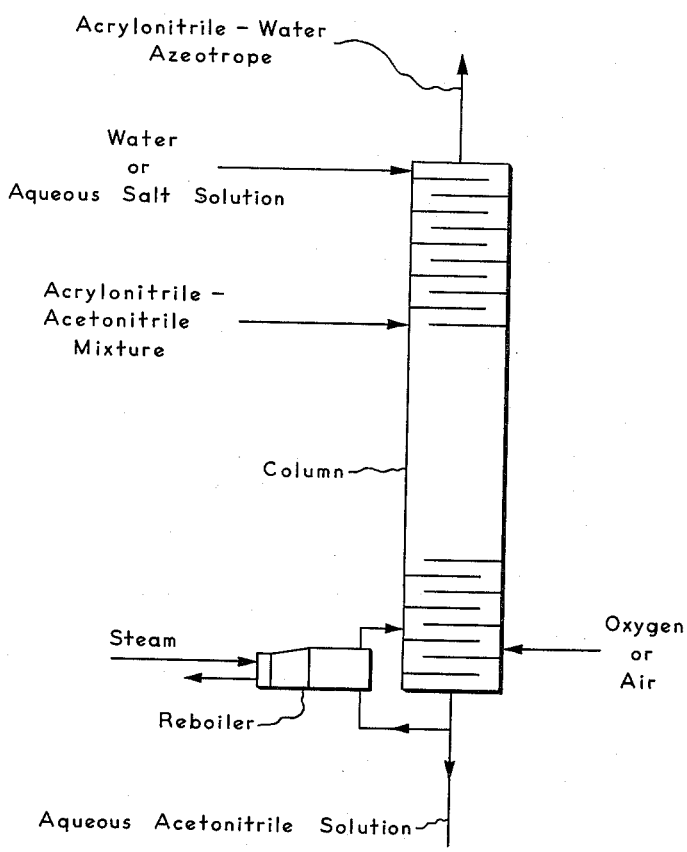

Nat C. Robertson, Wellesley, Mass., assignor, by mesne assignments, to Escambia Chemical Corporation, Pace, Fla., a corporation of Delaware Application April 28, 1954, Serial No. 426,308

3 Claims. (Cl. 202—39.5)

This invention relates to the separation of chemicals and in particular to the separation and purification of acrylonitrile from mixtures containing acetonitrile.

The principal object of the present invention is to provide an improved process for the separation of acrylonitrile from mixtures containing acrylonitrile and acetonitrile.

Another object of the present invention is to provide an extractive distillation process for the separation of acrylonitrile, in purified form, from a mixture containing acrylonitrile and acetonitrile.

Other objects of this invention will in part be obvious and will in part appear hereinafter.

The invention accordingly comprises the process involving the several steps and the order of one or more of such steps with respect to each of the others which are exemplified in the following detailed disclosure and the scope of which will be indicated in the claims.

For a fuller understanding of the nature and objects of the invention, reference should be had to the following detailed description.

Certain methods for the production of acrylonitrile result in the production of mixtures containing acrylonitrile and acetonitrile. For example, in the production of acrylonitrile by the vapor phase reaction between hydrogen cyanide and acetylene or by the dehydrogenation of propionitrile, mixtures containing predominantly acrylonitrile with appreciable quantities of acetonitrile are produced. In order to obtain the acrylonitrile in a state of high purity, it becomes necessary to separate it from the acetonitrile present. Several methods of separation have been proposed but these for the most part have failed to yield acrylonitrile of a high purity economically. For example, separation of the two anhydrous nitrile compounds by an ordinary straight fractional distillation does not produce acrylonitrile of a very high purity since their boiling points are but about 4° C. apart. Since the boiling points of the two nitriles differ by but a few degrees, it would require several distillations of the acrylonitrile distillates to produce a product of satisfactory purity. Thus an ordinary straight fractional distillation of a mixture of these nitriles would be undesirably expensive and impractical. Fractional distillation of a mixture of acrylonitrile, acetonitrile and water gives somewhat more effective separation than a straight fractional distillation of the anhydrous mixture. The temperature differences in the boiling points of the nitrile-water azeotropes formed is very slightly greater than that of the nitriles alone. However, since the boiling points of nitrile-water azeotropes differ by only about 6° C., it is still very difficult to obtain a good recovery of the acrylonitrile originally charged in the desired state of purity by fractional distillation of the wet mixture.

It has been found, however, that by subjecting a mixture containing acrylonitrile and acetonitrile to an extractive distillation employing water as the solvent, the relative volatility of the acetonitrile present in the mixture may be decreased to such an extent that acrylonitrile with a purity of over 99% may be recovered.

In accordance with the present invention, a mixture comprising acrylonitrile and acetonitrile is charged to a fractionating column provided with suitable plates, trays or packings to insure intimate vapor-liquid contact and, while being subjected to distillation, a stream of water is introduced at or near the top of the column. The amount of water introduced into the column should be sufficient to maintain above about 70 mole percent concentration of water in the liquid phase on the top plates of the column. In one preferred embodiment of the invention, about an 80 mole percent concentration of water in the liquid phase is preferably maintained on the top plates of the column. The overhead product or distillate comprises the acrylonitrile-water azeotrope while the product removed from the reboiler of the fractionating column comprises an aqueous solution of acetonitrile.

The following non-limiting example is set forth to illustrate the present invention:

A mixture containing 51.9 grams (64 mls.) of acrylonitrile and 50.2 grams (64 mls.) of acetonitrile together with sufficient water to form an azeotrope was boiled up through a 30 plate Oldershaw column having one inch diameter plates at a rate of approximately two to three milliliters per minute. Water heated to a temperature of approximately 65° C. was introduced into the column at a point immediately below the distillation head but above the top plate of the column. The rate of flow of the water entering the column was adjusted in proportion to the reflux rate so that the water concentration in the liquid phase on the top trays was about 80 mole percent. A stream of oxygen was continuously introduced into the reboiler section containing the nitrile-water mixture so as to inhibit polymerization of the acrylonitrile. The overhead product, which distilled off at 70° C., comprised the acrylonitrile-water azeotrope. Samples of the overhead product were removed at regular intervals and analyzed by refractive index measurements. 59.3 mls. of the acrylonitrile-water azeotrope containing 46.8 grams of acrylonitrile were removed before any contamination of the acrylonitrile-water azeotrope was determined. The acrylonitrile contained in this fraction had a refractive index of 1.3885 at 25° C. The refractive index of pure acrylonitrile, as reported by Davis and Wiedeman, "Industrial Engineering Chemistry," 37, 482 (1945), is 1.3888 at 25° C. Thus over 90% of the original acrylonitrile charged was recovered in a purity of almost 100% by but one distillation step. Succeeding fractions totaling only 13.7 mls. of a mixture of acetonitrile and acrylonitrile were distilled off before the water azeotrope of pure acetonitrile was obtained.

The difference in the boiling points of pure acetonitrile and acrylonitrile is on the order of 4° C. In the presence of quantities of water sufficient to form azeotropes with the two nitriles, the volatility of acrylonitrile is increased to a slightly greater extent than the increase in the volatility of acetonitrile so that the difference of the boiling points of their water azeotropes becomes but about 6° C. However, by subjecting a mixture containing the two nitriles to an extractive distillation employing water as the solvent, the relative volatility of the acetonitrile present in the mixture is decreased substantially so as to permit a more effective separation of pure acrylonitrile therefrom.

As mentioned previously, a quantity of water sufficient to form azeotropes with the nitriles is preferably present with the nitrile mixture. Additionally, while this mixture is being subjected to distillation, water is introduced into the fractionating column so as to maintain above about 70 mole percent concentration of water in the liquid phase on the top plates of the column. In the most preferred embodiment, the concentration of water in the liquid phase on the top plates of the column is maintained on the order of about 80 mole percent. The water solvent is introduced into the column at a point near the top of the column. This advantageously permits the water solvent to flow down all the plates of the column so as to effect a more thorough extraction of the acetonitrile rising in the column and returning it to the reboiler section. Aqueous salt solutions may also be used as solvents in place of water. The salt employed must be non-corrosive and stable to decomposition and hydrolysis at the distillation temperature. Aqueous solutions of potassium or sodium acetate or phosphate have been found to be suitable solvents since they enhance the volatility of acrylonitrile and make possible the use of less solvent.

It is also preferable that the solvent being introduced into the fractionating column be preheated to a temperature on the order of about 60° C. or higher if the distillation is to be carried out at atmospheric pressure. It has also been found preferable to introduce a stream of air or oxygen into the nitrile-water mixture during the extractive distillation so as to inhibit polymerization.

The overhead product or distillate comprises the acrylonitrile-water azeotrope while the product removed from the reboiler of the fractionating column comprises an aqueous solution of acetonitrile which may be distilled to give the acetonitrile-water azeotrope. These aqueous nitrile solutions may be dried, if desired, by any suitable method. Examples of satisfactory drying methods are (a) extraction with a water-immiscible hydrocarbon or (b) azeotropic distillation with benzene at atmospheric pressure or with diethyl ether at superatmospheric pressures.

This process is adaptable to either batch or continuous operation. In continuous operations as illustrated in the drawing the feed stream, comprising a mixture of acrylonitrile and acetonitrile is preferably continuously introduced at a suitable rate into the column below the point of introduction of the water solvent. The acrylonitrile-water azeotrope is taken off overhead while the aqueous acetonitrile solution is continuously removed from the bottom of the column. This process is equally effective in separating mixtures containing but small quantities of acetonitrile as well as to large quantities, as shown in the example. In addition, the process may be advantageously employed with mixtures containing propionitrile as well as acrylonitrile and acetonitrile.

Since certain changes may be made in the above process without departing from the scope of the invention herein involved, it is intended that all matter contained in the above description shall be interpreted as illustrative and not in a limiting sense.

What is claimed is:

1. A process for the separation of a mixture comprising acrylonitrile and acetonitrile which comprises subjecting said mixture in the presence of oxygen to an extractive distillation employing as solvent an aqueous solution of an alkali metal salt, maintaining the water concentration in the liquid phase above about 70 mole percent, removing acrylonitrile as an azeotrope with water overhead as one fraction, and separating an aqueous solution of acetonitrile as another fraction.

2. The process of claim 1 wherein the alkali metal salt comprises a compound selected from the group consisting of potassium and sodium acetate.

3. The process of claim 1 wherein the alkali metal salt comprises a compound selected from the group consisting of potassium and sodium phosphate.

References Cited in the file of this patent

UNITED STATES PATENTS

| | | |
|---|---|---|
| 1,896,158 | Calcott | Feb. 7, 1933 |
| 2,177,619 | Nicodemus | Oct. 24, 1939 |
| 2,305,106 | Pratt | Dec. 15, 1942 |
| 2,358,193 | Wentworth | Sept. 12, 1944 |
| 2,382,383 | Carpenter | Aug. 14, 1945 |
| 2,399,340 | Franz | Apr. 30, 1946 |
| 2,401,772 | Ralston et al. | June 11, 1946 |
| 2,407,861 | Woek | Sept. 17, 1946 |
| 2,415,662 | Teter et al. | Feb. 11, 1947 |
| 2,453,472 | Teter et al. II | Nov. 9, 1948 |
| 2,481,080 | Castner et al. | Sept. 6, 1949 |
| 2,548,369 | Harwood et al. | Apr. 10, 1951 |
| 2,551,584 | Carlson et al. | May 8, 1951 |
| 2,555,798 | Kropa | June 5, 1951 |
| 2,562,846 | Reider et al. | July 31, 1951 |
| 2,616,838 | Williams | Nov. 4, 1952 |
| 2,681,306 | Kemp et al. | June 15, 1954 |

OTHER REFERENCES

| | | |
|---|---|---|
| 949,405 | France | Aug. 30, 1949 |